March 2, 1948.   A. A. LOCKE   2,437,165
HELICOPTER LIFTING SCREW OPERATING MECHANISM
Filed April 27, 1944   3 Sheets-Sheet 2

INVENTOR.
ARTHUR A. LOCKE
BY
ATTORNEY

March 2, 1948.  A. A. LOCKE  2,437,165
HELICOPTER LIFTING SCREW OPERATING MECHANISM
Filed April 27, 1944     3 Sheets-Sheet 3

INVENTOR.
ARTHUR A. LOCKE
BY
ATTORNEY

Patented Mar. 2, 1948

2,437,165

UNITED STATES PATENT OFFICE 2,437,165

HELICOPTER LIFTING SCREW OPERATING MECHANISM

Arthur A. Locke, Detroit, Mich.

Application April 27, 1944, Serial No. 532,981

11 Claims. (Cl. 244—17)

This invention relates to helicopters, or direct lift aircraft, and in particular, it relates to the rotor hub for sustaining vertical screw blades of a helicopter type aircraft. More particularly, the invention relates to a direct lift aircraft embodying co-axial contrarotating air screw blades in combination with direct manual means for varying the angle of incidence of the blades, or for effecting cyclic pitch control.

It is recognized that co-axial contra-rotating blades have heretofore been disclosed and demonstrated. However, the successful application of such a type of direct lift aircraft depends principally upon means for controlling the pitch of the blades to within critical limitations. If the angle of incidence of the blades throughout their useful range of operation is not properly maintained, the aircraft becomes subjected to objectionable vibration and is difficult to control in flight. In accordance with the practice of my invention, I provide co-axial and contra-rotating airscrew blades in which the angle of incidence may be manually and positively controlled over a wide range of operating conditions so as to present each blade in an optimum efficient position with the relative wind. By maintaining positive control of the angle of incidence of the blades throughout their cycle of operation, many advantages accrue. In the first place, the contra-rotating blades provide automatic torque compensation, thus utilizing all available power for lift or directional flight. Also, the double set of blades, as compared with a single set of blades, permits a substantial reduction in blade span.

In combination with these features, it is among the objects of my invention to provide positive blade pitch control and variable cyclic pitch control; to provide a positive and uniform desired angle of incidence for direct ascent; to provide pitch control over one set of blades and a complementary opposite pitch inclination of the oppositely rotating set of blades; to provide means in the form of a single control through which the various changes in pitch result; to provide an efficient and dependable means for actuating and maintaining the angle of incidence of the blades; and, to provide a mechanism which is light in weight and economical of manufacture.

These and other objects and advantages of my invention will appear more fully in the following detailed description when considered in connection with the accompanying drawing, in which.

Figure 1:
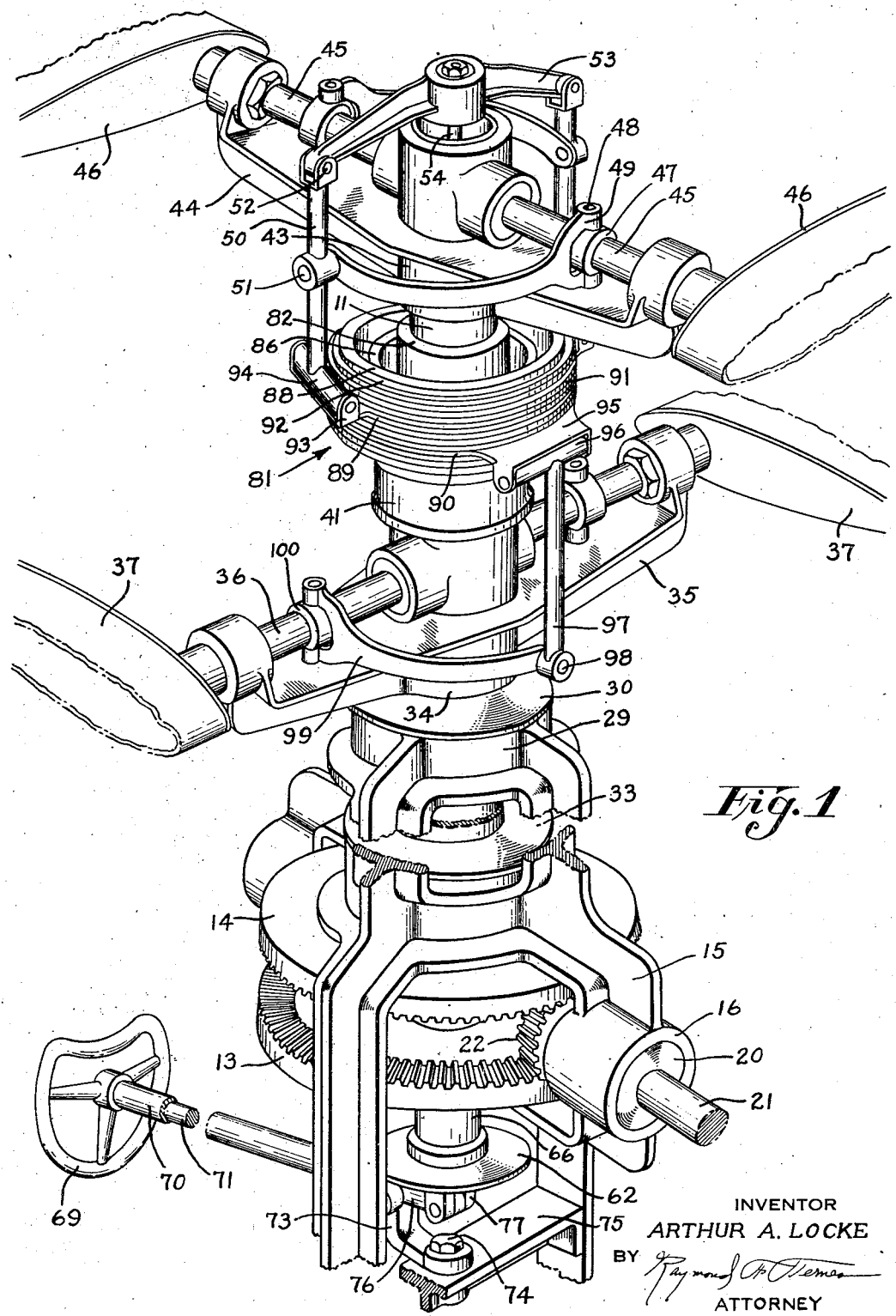
Figure 1 is a perspective view of a rotor head of my invention.
Figure 2:
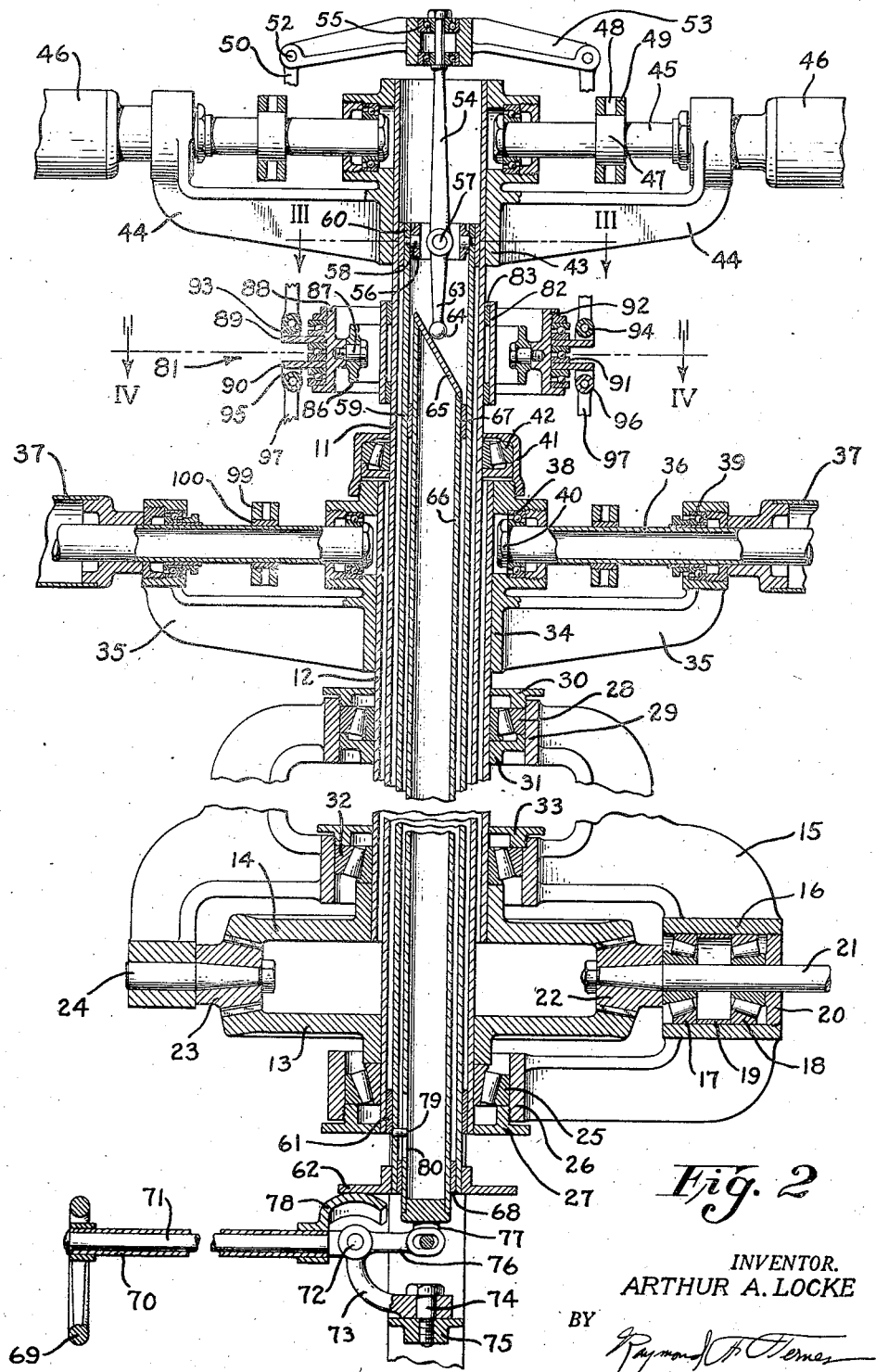
Figure 2 is a longitudinal view, in section, of the embodiment illustrated in Figure 1, except that the upper and lower sets of blades are illustrated in alignment.

With reference to the drawings and in particular to Figures 1 and 2, the invention consists of a rotor head comprising essentially a pair of tubular co-axial drive shafts 11 and 12 attached at their lower ends to bevel gears 13 and 14, respectively. A frame 15 supports the gears and the vertical tubular shafts 11 and 12. The frame 15 may be a part of or attached to the structural members of the helicopter. A hub 16 forming a part of the frame 15 forms a housing for supporting roller bearings 17 and 18, a spacer ring 19 and a bearing retainer 20. The bearings 17 and 18, in turn, support a shaft 21 to which is keyed a bevel drive gear 22 which meshes with the bevel gears 13 and 14. The shaft 21 extends to any suitable means for generating power. Diametrically opposite the gear 22 is a similar bevel gear 23 constituting an idler interposed between the bevel gears 13 and 14 and supported by the frame 15 through a shaft 24. By this arrangement, operation of the shaft 21 causes the tubular drive shafts 11 and 12 to rotate in opposite directions.

The tubular shaft 11 is supported at its lower end by a roller bearing 25, mounted in a hub 26, forming part of the frame 15. A retaining member 27 maintains the bearing 25 in proper relative position. At the upper end of the frame 15 is a roller bearing 28, mounted in a hub 29, forming part of the frame 15. The bearing 28 is held in place by a retaining member 30, and a flange 31 attached to the tubular drive shaft 12 also engages the bearing. A similar bearing 32 and retainer 33 function to support the lowermost portion of the tubular drive shaft 12.

Attached to the upper end of the tubular drive shaft 12 is a hub 34 having arms 35 extending therefrom. This hub and arm combination supports a horizontally positioned tubular member 36 which, in turn, is attached to and supports a blade 37. Bearings 38 and 39 are interposed between the tubular member 36 and the hub and arm combination. By this arrangement the blade 37 is free to pivot on the axis of the tubular member 36. At the inward end of the member 36 is a nut 40 which restricts outward movement of the member 36. A similar blade and associated structural supports is shown in diametrically opposed position. While two blades are shown as constituting a unit, it is to be understood that one or more blades may be used, as desired.

At the top of the hub 34, and attached thereto, is a cap 41 enclosing a roller bearing 42 which supports the tubular shaft 11 and maintains it in co-axial relationship with the tubular shaft 12.

Attached to the upper end of the tubular shaft 11 is a hub 43 having arms 44 extending therefrom. In a similar manner to the hub 34 and arm 35, the present hub 43 and arm 44 combination, functions to support a horizontal tubular member 45, through bearings, and a vertical screw blade 46. This upper blade unit also constitutes a pair of blades 46 diametrically opposed.

A control mechanism is provided for imparting rotary motion to the tubular member 45 in order to vary the angle of incidence of the blade 46. This is accomplished by a lever mechanism extending through the tubular shaft 11. More particularly, a collar 47 is attached to the tubular member 45, and vertically extending pins 48 project from the collar. An arcuate arm 49 (Figure 1) pivotally associated with the pin 48, extends in a substantially horizontal direction over an angle of about 90 degrees where it connects to a vertical link 50, through a ball and socket joint 51. The connecting link 50 is pivotally attached at 52 to an arm 53 supported by a lever 54, through ball bearings 55. By this arrangement, the arm 49 connecting link 50 and arm 53 rotate with the tubular drive shaft 11 while the lever 54 does not rotate. A similar arm 53 cooperates with the diametrically opposed blade assembly.

Figure 3:
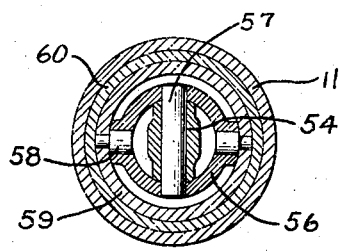
Figure 3 is a transverse view, in section, taken along lines III—III of Figure 2.

The angle of incidence of the blades 46 may be varied by moving the lever 54 in an axial direction. As shown in Figures 2 and 3, the lever 54 is pivotally attached to a gimbal ring 56 by means of a pin 57. The gimbal ring, in turn, is pivotally pinned at 58 to a sleeve 59 lying within the tubular drive shaft 11. The pivot 58 is located in a position measuring 90 degrees from the lever pin 57. A bushing 60 pressed onto the end of the sleeve 59 is slidable within the tubular drive shaft 11. A similar bushing 61 is located at the lowermost portion of the tubular drive shaft 11. A flange 62, attached, to the lower end of the sleeve 59, cooperates with means, hereinafter described, for raising or lowering the sleeve 59. This movement, in turn, raises or lowers the lever 54 axially of the assembly, thus imparting a rotary motion to the tubular member 45 for varying the angle of incidence of the blades 46.

While a direct vertical movement of the lever 54 results in imparting a uniform change in angle of incidence of the various blades, the angle of incidence may be changed in such manner as to provide cyclic pitch control. This is effected by tilting the lever 54 in the desired direction. To effect the tilting operation, an arm 63 extends downwardly from the lever 54. This arm 63 terminates with a spherical end 64 contacting a cam plate 65 attached to the end of a sleeve 66 positioned axially within the sleeve 59. The cam plate 65 takes the form of a beveled end surface of the sleeve 66. A bushing 67 is pressed onto the sleeve 66 near its upper end, and is slidable within the sleeve 59. A similar bushing 68 located near the lower end of the sleeve 66 maintains the sleeve 66 in slidable relation with the sleeve 59.

In order to actuate the lever 54 to accommodate its various functions, it is necessary that the sleeves 59 and 66 be axially slidable, independent of each other, and that the sleeve 66 be rotatable over a range of substantially 180 degrees. All of these movements may be accomplished through the operation of a single control wheel 69. The wheel 69 is attached to a sleeve 70 rotatable about a lever 71. The lever, in turn, is pivotally pinned at 72 to a bracket 73, and the bracket, in turn, is pivoted axially of the assembly by means of a stud 74 secured to an extension member 75 of the main frame 15. An arm 76 forming an extension of the lever 71 pivotally engages with a lug 77 attached to the lowermost portion of the sleeve 66. As thus provided, a vertically swinging movement of the hand wheel 69 results in a vertically reciprocal movement of the sleeve 66. Also, a horizontally swinging movement of the hand wheel 69 causes a rotating movement of the sleeve 66. To obtain the vertical movement of the sleeve 59, a cam 78 is provided for engagement with the flange 62. The cam is attached to the sleeve 70 and is shaped radially in respect to the pivot 72 so that vertical swinging movement of the hand wheel 69 will not interfere with the vertical movement of the sleeve 59. It is also obvious that horizontal swinging movement of the hand wheel 69 will not affect movement of the sleeve 59. The cam 78, however, assumes a cam profile in respect to a plane transversely of the axis of the lever 71 at a point in alignment with the pivot 72. By such a construction, rotary movement of the hand wheel 69 will set the cam 78 into operation so as to raise or lower the flange 62 and, consequently, the sleeve 59. The sleeve 59 and its associated mechanism is of sufficient weight so that the flange 62 will always lie in contact relation with the cam 78. As thus described, it is apparent that three separate and distinct movements of the hand wheel 69 may be operated, independently or simultaneously, to effect selective operable movement of either or both of the sleeves 59 and 66.

Figure 4:
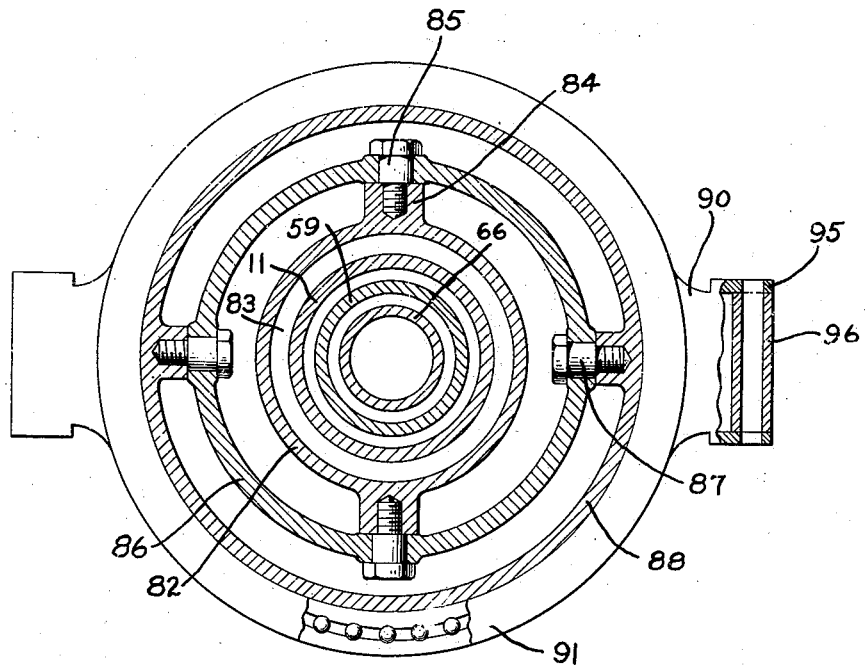
Figure 4 is a transverse view, in section, taken along lines IV—IV of Figure 2.

To prevent unnecessary rotation of the sleeve 59, due to its adjacent engagement with the tubular drive shaft 11, a pin 79 is attached to the sleeve 59 and is slidable in a slot 80 extending along a length of the sleeve 66. As thus far described, means have been provided for the structure and operation of the upper set of blades. It is necessary to transfer a complementary and opposite angle of incidence to the lower set of blades which are rotating in an opposite direction. All of these movements are transferred from the upper set of blades to the lower set of blades initially through the connecting link 50. A gimbal unit 81 is employed for transferring this movement to oppositely rotating sets of blades. The gimbal unit 81 is shown particularly in Figures 1 and 4. It includes a hub 82 having bushings 83 pressed internally at the ends thereof, the bushings being slidable along the tubular drive shaft 11. Bosses 84 project from the hub 82 at diametrically opposed positions for pivotally supporting through studs 85 a gimbal ring 86. At a position measuring 90 degrees from the studs 85, another set of pivot studs 87, also diametrically opposed, connect the gimbal ring with a transfer ring 88. Loosely positioned around the transfer ring are upper and lower discs 89 and 90, respectively. These discs are separated from each other and from the ends of the transfer ring by ball thrust bearings 91. A retainer 92 threaded onto the transfer ring 88 clamps the ball thrust bearings 91 and the discs 89 and 90 in a position to permit free rotary movement of the discs 89 and 90. The disc 89 is provided with an extension 93, and the connecting link 50, through a wide hub 94, is pivotally attached thereto. The disc 90 is also provided with an extension 95 to which a wide hub 96 is pivotally attached. Joining the hub 96 is a connecting link 97 which, through a ball and socket join 98, connects with an arm 99. The arm 99 is similar to the arm 49 associated with the upper set of blades. As with the upper set of blades, the arm 99 pivotally connects with a collar 100 attached to the tubular member 36, thus movement of the arm 99 functions to control the angle of incidence of the lower set of blades.

In the operation of the rotor head, the tubular shafts 11 and 12 rotate in an opposite direction, thus driving in opposite directions the upper and lower sets of blades. As shown in Figure 1, the upper set of blades rotate in a clockwise direction looking downwardly on the rotor head. The lower set of blades rotate in a counter-clockwise direction. The remaining operative mechanism is concerned principally with the manual control of angle of incidence of the blades. As the helicopter rests upon the ground the blades are positioned in a neutral or negative angle of incidence. If it is desired to cause vertical ascent of the helicopter the pilot operates the hand wheel 69 in a turning motion so that the cam 78 elevates the flange 62. This, in turn, moves the sleeve 59 in an upward position, carrying with it the lever 54. By means of the arm 53 and connecting link 50, the arcuate arm 49 is actuated so as to increase the angle of incidence of the upper set of blades. Upward movement of the connecting link 50 also operates to cause the gimbal unit 81 to slide upwardly on the tubular drive shaft 11. In its upward movement, the gimbal unit carries with it the connecting link 97, thus actuating the arm 99 for increasing the angle of incidence of the lower set of blades. Thus, it is apparent that rotary movement of the hand wheel 69 will result in a uniform control of the angle of incidence of both the upper and lower sets of blades, and that this uniform change in the angle of incidence of all the blades is accomplished notwithstanding the difficulty of transmitting similar motions from a set of blades operating in one direction to a set of blades operating in an opposite direction. It is to be understood that the lower set of blades may have a greater pitch than the upper set of blades. This is of advantage because the velocity of the relative wind is greater with respect to the lower set of blades due to the slipstream resulting from the upper set of blades.

In order to accomplish flight in a horizontal direction, it is necessary to vary the angle of incidence of the blades, depending upon the position of each blade as it is rotated. In other words, a cyclic pitch control is required in which the foremost blade in the direction of flight has a substantially neutral angle of incidence, whereas the blade in a substantially aft position assumes a relatively high angle of incidence. The blades, when assuming a lateral position relative to the direction of flight, also require a different angle of incidence; that is, the retreating blade has a higher angle of incidence than the advancing blade. This cyclic pitch control is obtained manually by the operator by merely swinging the hand wheel 69 so that it will move about the pivot 72. This results in an axial movement of the sleeve 66 causing the cam 65 to deflect the spherical ball 64 off of its normal central position. Through the gimbal ring 56, the lever 54 may be tilted in any desired direction. This tilting of the lever 54 generally results in an increase in the angle of incidence of one of the blades, and a lesser or neutral angle of incidence of its diametrically opposed blade. The gimbal unit 81 also tilts in any desired direction, thus, resulting in a corresponding variance in the angle of incidence of the lower set of blades. Therefore, by merely swinging the hand wheel 69 about the pivot 72 a cyclic pitch control is effected for inducing horizontal flight. While the cyclic pitch control is in effect, a further increase or decrease in the angle of incidence of all of the blades may be obtained by merely rotating the hand wheel 69. While this control may be operated entirely independent of the cyclic pitch control it, nevertheless, may be operated simultaneously therewith.

The direction of horizontal flight may be selected by the pilot by swinging the hand wheel 69 so that it moves about the pivot 74. This action imparts rotary movement to the sleeve 66 which determines the direction of tilt of the lever 54. The operation of the hand wheel 69 about the pivot 74, therefore, determines the position whereat the greater or lesser angle of incidence occurs in the cycle of rotation of the blades and, accordingly, determines the direction of flight of the aircraft.

The control wheel 69 thus operates a uniform change in the angle of incidence of all the blades, effects a cyclic pitch control, and permits selective directional flight. These three control operations may each be effected individually, or they may be operated simultaneously in any combination desired.

As thus shown and described, it is believed apparent that I have provided a novel and unique arrangement of parts and controls therefor, for the construction and operation of a helicopter in which simplicity is obtained in the construction and function of a complex operation in the change of the angle of incidence throughout its entire useful range of operation. While I have described a preferred embodiment of my invention, it is to be understood that it is susceptible of those modifications which appear obviously within the spirit of the invention, and as appearing within the scope of the appended claims.

Having thus described my invention, what I claim and desire to protect by Letters Patent, is:

1. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, and means operable by a pilot comprising a member adaptable for vertically reciprocal and rotatable movement extending through said second named means for both positioning and actuating said tiltable portion in a directionally selected manner, each of said pilot operating means constituting a combined manual control and being actuable simultaneously or independently for effecting a uniform change in angle of incidence or a different change in angle of incidence of the different blades.

2. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, means operable by a pilot comprising a member adaptable for vertically reciprocal and rotatable movement extending through said second named means for both positioning and actuating said tiltable portion, and means operable by a pilot for selecting the direction of tilt of said tiltable portion.

3. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, means operable by a pilot comprising a member adaptable for vertically reciprocal and rotatable movement extending through said second named means for both positioning and actuating said tiltable portion, and means operable by a pilot for selecting the direction of tilt of said tiltable portion, each of said pilot operating means constituting a combined manual control and being actuable simultaneously or independently for effecting a uniform change in angle of incidence or a different change in angle of incidence of the different blades.

4. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, means operable by a pilot comprising a member adaptable for vertically reciprocal and rotatable movement extending through said second named means for both positioning and actuating said tiltable portion in a directionally selective manner, a second drive shaft positioned coaxially of said first drive shaft and rotatable in opposite direction, air screw blades supported and rotated by the second drive shaft, and means for transferring the angle of incidence movement from one set of blades to the other and oppositely rotating set of blades.

5. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, means operable by a pilot comprising a member adaptable for vertically reciprocal and rotatable movement extending through said second named means for both positioning and actuating said tiltable portion in a directionally selective manner, each of said pilot operating means constituting a combined manual control and being actuable simultaneously or independently for effecting a uniform change in angle of incidence or a different change in angle of incidence of the different blades, a second drive shaft positioned coaxially of said first drive shaft and rotatable in opposite direction, air screw blades supported and rotated by the second drive shaft, means for transferring the angle of incidence movement from one set of blades to the other and oppositely rotating set of blades.

6. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, means operable by a pilot comprising a member adaptable for vertically reciprocal and rotatable movement extending through said second named means for both positioning and actuating said tiltable portion, means operable by a pilot for selecting the direction of tilt of said tiltable portion, a second drive shaft positioned coaxially of said first drive shaft and rotatable in opposite direction, air screw blades supported and rotated by the second drive shaft, and means for transferring the angle of incidence movement from one set of blades to the other and oppositely rotating set of blades.

7. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, means operable by a pilot comprising a member adaptable for vertically reciprocal and rotatable movement extending through said second named means for both positioning and actuating said tiltable portion, means operable by a pilot for selecting the direction of tilt of said tiltable portion, each of said pilot operating means being actuatable simultaneously or independent of each other, a second drive shaft positioned coaxially of said first drive shaft and rotatable in opposite direction, air screw blades supported and rotated by the second drive shaft, and means for transferring the angle of incidence movement from one set of blades to the other and oppositely rotating set of blades.

8. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, means operable by a pilot comprising a member adaptable for vertically reciprocal and rotatable movement extending through said second named means for both positioning and actuating said tiltable portion, a second drive shaft positioned coaxially of said first drive shaft and rotatable in opposite direction, air screw blades supported and rotated by the second drive shaft, means for transferring the angle of incidence movement from one set of blades to the other and oppositely rotating set of blades, said transferring means comprising an axially slidable gimbal track, arms connecting the pilot operable means with the track, and means connecting the track with the said oppositely rotating set of blades.

9. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, means operable by a pilot comprising a member adaptable for vertically reciprocal and rotatable movement extending through said second named means for both positioning and actuating said tiltable portion, each of said pilot operating means being actuatable simultaneously or independent of each other, a second drive shaft positioned coaxially of said first drive shaft and rotatable in opposite direction, air screw blades supported and rotated by the second drive shaft, means for transferring the angle of incidence movement from one set of blades to the other and oppositely rotating set of blades, said transferring means comprising an axially slidable gimbal track, arms connecting the pilot operable means with the track, and means connecting the track with the said oppositely rotating set of blades.

10. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, means operable by a pilot comprising a member adaptable for vertically reciprocal and rotatable movement extending through said second named means for both positioning and actuating said tiltable portion, means operable by a pilot for selecting the direction of tilt of said tiltable portion, a second drive shaft positioned coaxially of said first drive shaft and rotatable in opposite direction, air screw blades supported and rotated by the second drive shaft, means for transferring the angle of incidence movement from one set of blades to the other and oppositely rotating set of blades, said transferring means comprising an axially slidable gimbal track, arms connecting the pilot operable means with the track, and means connecting the track with the said oppositely rotating set of blades.

11. In a helicopter, a hollow drive shaft, air screw blades supported and rotated by the drive shaft, said blades being movable to permit variation in angle of incidence, an arm adaptable for movement for changing the angle of incidence of each blade, means extending axially through the drive shaft and engageable with said arm, means operable by a pilot to impart axial movement to the means extending through the drive shaft, said means extending through the drive shaft being tiltable in part for simultaneously effecting a different angle of incidence of the different blades, means operable by a pilot comprising a member adaptable for vertically reciprocal and rotatable movement extending through said second named means for both positioning and actuating said tiltable portion, means operable by a pilot for selecting the direction of tilt of said tiltable portion, each of said pilot operating means being actuatable simultaneously or independent of each other, a second drive shaft positioned coaxially of said first drive shaft and rotatable in opposite direction, air screw blades supported and rotated by the second drive shaft, means for transferring the angle of incidence movement from one set of blades to the other and oppositely rotating set of blades, said transferring means comprising slidable gimbal track, arms connecting the pilot operable means with the track, and means connecting the track with the said oppositely rotating set of blades.

ARTHUR A. LOCKE.

REFERENCES CITED

The following references are of record in the file of this patent:

UNITED STATES PATENTS

| Number | Name | Date |
| --- | --- | --- |
| 1,272,846 | Perry | July 16, 1918 |
| 1,449,129 | Pescara | Mar. 20, 1923 |
| 2,080,522 | Wilford et al. | May 18, 1937 |
| 2,088,413 | Hafner | July 27, 1937 |
| 2,256,635 | Young | Sept. 23, 1941 |
| 2,256,918 | Young | Sept. 23, 1941 |

FOREIGN PATENTS

| Number | Country | Date |
| --- | --- | --- |
| 155,985 | Austria | Apr. 25, 1939 |